United States Patent [19]

Degagne

[11] Patent Number: 4,735,397
[45] Date of Patent: Apr. 5, 1988

[54] FENCING SYSTEM OF PLASTICS MATERIAL

[76] Inventor: Rene P. Degagne, Box 98, Warner, Alberta, Canada, T0K 2L0

[21] Appl. No.: 7,607

[22] Filed: Jan. 28, 1987

[51] Int. Cl.⁴ ............................................ E04H 17/14
[52] U.S. Cl. ........................................ 256/65; 403/263
[58] Field of Search ............... 256/72, 65, 66, 67, 256/53, 48; 5/296; 403/263

[56] References Cited

U.S. PATENT DOCUMENTS

| | | |
|---|---|---|
| 69,444 | 10/1867 | Johnson ............................ 256/65 X |
| 545,460 | 9/1895 | Diller . |
| 636,855 | 11/1899 | Sawyer . |
| 685,661 | 10/1901 | Wright . |
| 722,126 | 3/1903 | Mitchell . |
| 800,427 | 9/1905 | Clough . |
| 1,030,497 | 6/1912 | Wagner . |
| 1,815,994 | 11/1930 | Thompson . |
| 2,346,111 | 4/1944 | MacKenzie ............................ 256/67 |
| 2,459,880 | 1/1949 | Hill ...................................... 5/296 X |
| 3,116,911 | 12/1960 | Dragunas et al. . |
| 3,700,213 | 10/1972 | Blease ................................. 256/19 |
| 3,776,522 | 12/1973 | Bartlett . |
| 3,891,189 | 6/1975 | Russo . |
| 4,324,388 | 4/1982 | Klaser . |

*Primary Examiner*—Andrew V. Kundrat
*Attorney, Agent, or Firm*—Stanley G. Ade; Adrian D. Battison; Murray E. Thrift

[57] ABSTRACT

A fencing system comprises a plurality of posts, a plurality of runners for interconnecting the posts and pickets extending vertically relative to the horizontal runners. The pickets, runners and posts are formed from moulded plastics material. The post includes a plurality of slots in outer faces thereof each slot having a transverse pin arranged centrally thereof for receiving a hook member at a respective end of a runner. In addition the posts include M-shaped notches at corners thereof for receiving a wire extending past the post and supported thereby. A lower end of the post includes a transverse surface which converges to an apex to prevent frost heave.

18 Claims, 2 Drawing Sheets

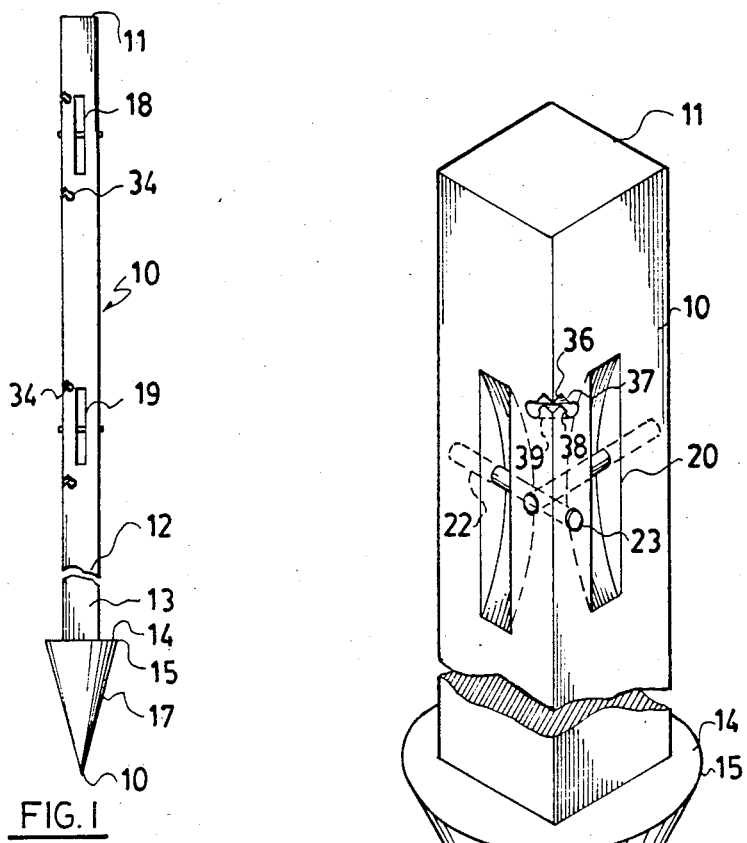
FIG. 1
FIG. 2
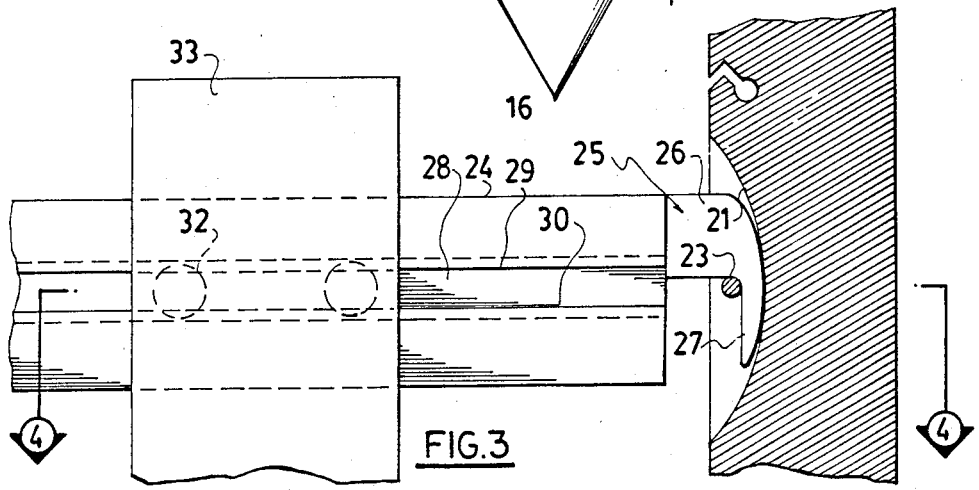
FIG. 3

FENCING SYSTEM OF PLASTICS MATERIAL

BACKGROUND OF THE INVENTION

This invention relates to a fenching system and particularly to one manufactured by a moulding technique from a plastics material.

Fencing systems particularly for use in a farm environment require continual maintenance and attention to remain in a satisfactory condition. This is particularly important in the farming environment in view of the fact that damaged fences can cause loss of livestock and can allow access to the fields by unauthorized persons.

Generally such fencing systems use barbed wire as the main fencing component with posts for supporting the barbed wire manufactured either from metal or from wood. Wooden posts, of course, are very prone to rotting at ground level and require regular replacement. Metal posts similarly have problems with corrosion and also provide difficulty in attaching the barbed wire to the post.

In addition fencing systems are required for more decorative or home uses in which a pair of runners are supported between adjacent posts with pickets or page fencing supported on the runners. In such cases a low maintenance requirement is of high priority in the choice of such fencing with wood thus becoming less popular and being replaced by metal posts which however are very unattractive and are still subject to some corrosion.

Various prior proposals have been made for fencing systems which are manufactured from a plastics material including various designs and arrangements which overcome or attempt to overcome the unique problems which are generated by the use of plastics as the material of the fencing system.

However none of these previous designs has provided an effective product for use in a farming environment or a product which is sufficiently adaptable for use either in a farming environment or in a less commercial situation.

It is one object of the present invention, therefore, to provide an improved fencing system of the type which can be moulded from a plastics material.

According to the invention, therefore, there is providing a fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot.

The invention, therefore, provides a unique method of coupling a post to a runner with the runner either being used to support pickets or page fencing or to provide a coupling between an end post and a stabilizing post for supporting a wire with the main tension on the wire acting to pull on the end post.

In addition the post can be designed with notches of a particular shape at the corners of the post for receiving wire and retaining it in the required position.

The runners can include a finger which projects over the pin into the slot to retain the runner in position. The runner can include along a side surface thereof a slot, the width of which increases with increasing depth so as to receive the head of a screw or the like for attaching a picket to the runner.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view of a post of the fencing system.

FIG. 2 is an isometric view of an upper part of the post of FIG. 1.

FIG. 3 is a cross sectional view through the post of FIG. 1 with a runner and picket attached thereto.

In the drawings like characters of reference indicate corresponding parts in the different figures.

DETAILED DESCRIPTION

Figure 4:
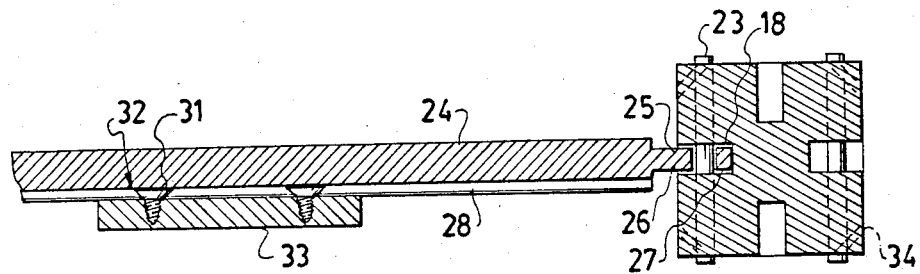
FIG. 4 is a cross sectional view along the lines 4—4 of FIG. 3.

The post of FIGS. 1 and 2 is generally indicated at 10 and is of substantially constant square cross section from an upper end 11 to ground level indicated at 12 and beyond ground level into an underground portion indicated at 13. At a lowermost end of the post, the square cross section terminates at a surface 14 which is a horizontal upwardly facing outwardly extending surface which increases the transverse cross section of the post. The surface 14 has a circular outer edge 15 and on an underside thereof is conical so as to converge to an apex 16 with an outer wall 17.

The apex 16 is shaped to allow the post to be driven into the ground by force applied at the top of the post and the surface 14 is arranged so that it engages soil and other material around the post to prevent the post lifting out of the ground and thus resist "frost heave".

The post may be solid as shown or may be formed with a hollow core.

On each of the four sides of the post is arranged a pair of slots 18 and 19. The slots 18 and 19 are spaced so that one is arranged adjacent the top of the post while the other is arranged closer to the ground. The slots are vertically aligned. Only one face of the post is shown in FIG. 1 but it will be appreciated that the slots are also provided in the three other faces, one of which is visible in FIG. 2 where a second slot is arranged and indicated at 20.

Each of the slots is of the shape shown in cross section in FIG. 3 that is it extends into the body of the post from the outer surface with a rear surface indicated at 21 shaped as a sector of a circle. The width of the slots is constant over the height of the slot. A transverse bore intersecting the slot is provided at 22 for receiving a pin 23 which extends across the slot at approximately the mid height thereof and approximately halfway from the front face of the post to the furtherest extent of the rear face 21. The pin is preferably of a metal for example steel for providing a strong attachment for one end of a runner shown best in FIGS. 3 and 4.

Each of the runners comprises an elongate beam member of a width approximately half that of a post and a height slightly greater than the width thereof. At each end of the runner indicated generally at 24 in FIGS. 3 and 4 is an attachment finger member 25 for engaging over the pin 23 within the slot 18. The attachment finger device includes a forwardly projecting portion 26 which extends into the slot and a downwardly hooked finger 27 for engaging over the pin 23 and against the rear surface 21 of the slot.

The runner 24 is formed of a moulded plastics material and has along one side face thereof a slot 28 which opens onto the outer surface at edges 29, 30 thereof with the edges tapering outwardly as the depth of the slot increases so as to form a tapered surface for engaging a head 31 of a screw 32 secured to a picket 33. Thus the screw 32 can be attached into a rear surface of the picket 33 and then the screws 32 and the picket slid along the runner to a required location where they can be permanently attached by the use of a suitable adhesive. Thus the screws securely and simply retain the pickets against the side of the runner following which the runner can be attached to two adjacent posts. It will be of course be appreciated that a second runner is attached at a lower end of the picket 33 for engagement into the slot 19 of the post 10.

In addition the post 10 includes a plurality of notches 34 for receiving a wire extending along from one post to the next. The wire is shown in FIGS. 5 and 6 and indicated generally at 35.

Each of the notches 34 is arranged at a corner of the square cross section of the post and includes a first portion 36 which extends upwardly and inwardly into the post followed by a downwardly and inwardly extending portion 37 terminating in an enlarged section 38. Thus in front elevation the notch appears in the shape of an "M" so that wire inserted into the notch firstly is lifted up to a top edge of the first portion and then dropped into the enlarged section 38 at the lower end of the second portion 37. The enlarged section 38 thus defines a bore 39 passing through the post at the corner for receiving the wire and retaining the wire firmly attached to the post against movement therefrom except a deliberate movement which acts to lift the wire in the first direction and then to lower it down the first portion for release from the edge of the post.

As shown in FIG. 1, four such notches are arranged along one corner of the post for receiving four strands of wire with each notch being arranged at a top and bottom respectively of the slots 18 and 19. Three such corners of the post include the notches 34 as best shown in FIG. 4.

Figure 5:
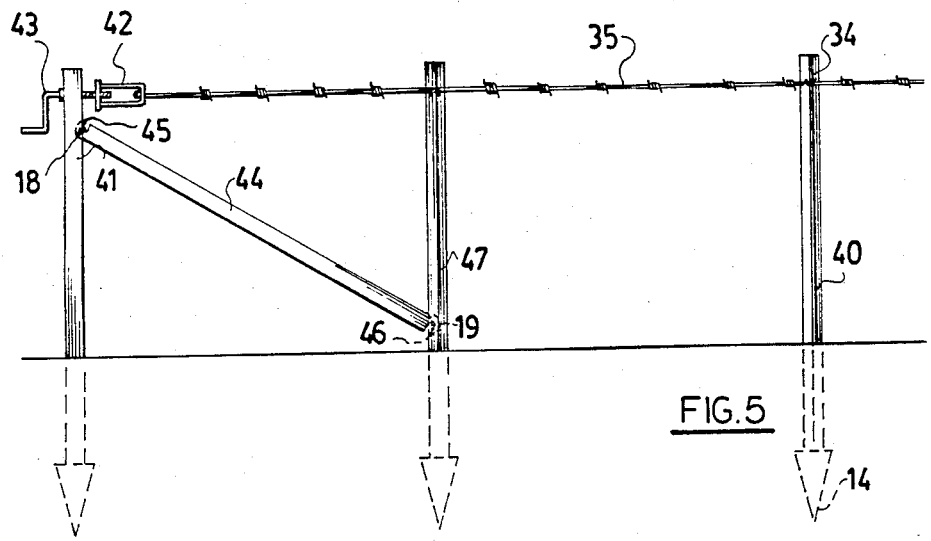
FIG. 5 is a side elevational view of the fencing system showing an end post for attachment to a wire and a stabilizing post coupled thereto by a runner.
Figure 6:
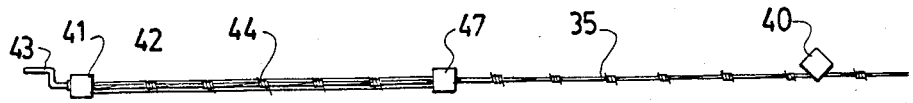
FIG. 6 is a top plan view of the fencing system of FIG. 5.

An assembled fencing system is illustrated in FIGS. 5 and 6 and comprises a first post 40 which is one of a number of intermediate posts in which the notches 34 only are used for engaging the various strands of wire of which there may be three or four as required. An end post 41 is arranged at one end of the wire 35 and includes a turnbuckle 42 engaging a hand cranked screw 43 which can be rotated to adjust the position of the turnbuckle 42 relative to the front face of the post 41 and thus to adjust the tension in the wire 35 depending upon the temperature of the wire which can vary significantly between summer and winter temperatures.

The end post 41 cooperates with a runner 44 which is basically of the type shown in FIGS. 3 and 4 but has at one end an upturned hook member 45 for engaging in the respective slot 18 and at a lower end a downturned hook members 46 for engaging in the respective slot 19 of a restraining post 47 positioned as the next post along the wire 35. The runner 44 thus extends from an upper end diagonally downwardly toward a lower end at the restraining post 47 for resisting twisting or leaning movement of the post 41 caused by the tension in the wire 35.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot and positioned from the rear surface of the slot for receiving a hook member between the pin member and against said rear surface.

2. The invention according to claim 1 wherein the post is rectangular in cross section defining four sides thereof, each side having a pair of end receiving means therein arranged at substantially centrally thereof.

3. The invention according to claim 1 wherein each slot is shaped in vertical transverse cross section substantially as a sector of a circle.

4. The invention according to claim 1 wherein said pin member is formed from metal and is arranged at a mid height of said slot.

5. A fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot, and wherein said post further includes a plurality of notches shaped and arranged to receive and retain wire extending across said post.

6. The invention according to claim 5 wherein said post is polygonal in horizontal cross section defining a number of apexes and wherein each notch is arranged at an apex.

7. The invention according to claim 5 wherein each notch comprises a first channel portion inclined upwardly and inwardly relative to said post and a second channel portion inclined downwardly and inwardly from an upper end of said first portion and an enlarged portion at a lower end of said second portion for retaining said wire in position in said enlarged portion.

8. The invention according to claim 5 wherein each notch comprises a first channel portion inclined upwardly and inwardly relative to said post and a second channel portion inclined downardly and inwardly from an upper end of said first portion and an enlarged portion at a lower end of said second portion for retaining said wire in position in said enlarged portion and wherein said enlarged portion defines a bore extending through said post across a corner.

9. The invention according to claim 1 wherein said post includes a surface adjacent a lower end thereof extending outwardly from the post so as to engage the ground to inhibit lifting of the post from the ground.

10. The invention according to claim 9 wherein said post has a substantially constant cross section from an upper end thereof to said surface with said surface lying in a horizontal plane and extending outwardly from said constant cross section.

11. The invention according to claim 10 wherein the post converges from an outer edge of said surface to a lowermost apex.

12. The invention according to claim 1 including a plurality of runners for extending between each post and a next adjacent post, each of said runners including a hook member at respective opposed ends thereof for engaging into said slot and behind said pin member.

13. The invention according to claim 12 wherein the width of said runner at said hook member is reduced.

14. The invention according to claim 12 wherein said hook member includes a forwardly projecting portion for extending into said slot and a downwardly projecting finger member for engaging behind said pin member.

15. The invention according to claim 12 wherein said runners are formed as an integral plastic moulding.

16. A fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot and, a plurality of runners for extending between each post and a next adjacent post, each of said runners including a hook member at respective opposed ends thereof for engaging into said slot and behind said pin member and wherein said runner includes a slot along one side thereof, the width of the slot increasing as the depth thereof increases whereby the slot can receive and retain a head of an attachment device for attaching a picket to the runner, the head being slidable along the slot from one end of the runner.

17. A fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot and, a plurality of runners for extending between each post and a next adjacent post, each of said runners including a hook member at respective opposed ends thereof for engaging into said slot and behind said pin member including a runner having at one end a hook member arranged to project in one direction relative to said runner and at the other end a hook member arranged to project in the opposed direction relative to the runner for engaging respective posts at an inclined direction.

18. A fencing system comprising an integral moulded plastics post having a length such that it can extend from beneath the ground to a position exposed from the ground and two pairs of end receiving means for receiving and retaining the ends of longitudinal runners, each pair being arranged in spaced vertically aligned relationship in said exposed portion with one pair on one side of the post and the other pair on an opposed side of the post, each end receiving means comprising a vertically extending slot in said post and a transverse separate pin member extending through a transverse bore through said post intersecting said slot and including a hand crank device for adjusting relative to a surface of the post the distance of an attachment mechanism for receiving a wire whereby the tightness of the wire can be adjusted.

* * * * *